United States Patent
Krishnaiah et al.

(10) Patent No.: US 8,926,935 B2
(45) Date of Patent: Jan. 6, 2015

(54) COMPRESSION PROCESSES FOR GRAPHENE SHEETS

(75) Inventors: Gautham Krishnaiah, Ellicott City, MD (US); John Lettow, Washington, DC (US)

(73) Assignee: Vorbeck Materials Corp., Jessup, MD (US)

( * ) Notice: Subject to any disclaimer, the term of this patent is extended or adjusted under 35 U.S.C. 154(b) by 0 days.

(21) Appl. No.: 12/766,724

(22) Filed: Apr. 23, 2010

(65) Prior Publication Data
US 2011/0101554 A1      May 5, 2011

Related U.S. Application Data

(60) Provisional application No. 61/171,871, filed on Apr. 23, 2009.

(51) Int. Cl.
C01B 31/04   (2006.01)
B82Y 30/00   (2011.01)
B82Y 40/00   (2011.01)

(52) U.S. Cl.
CPC .............. *C01B 31/0446* (2013.01); *B82Y 30/00* (2013.01); *B82Y 40/00* (2013.01); *C01B 31/0469* (2013.01); *C01B 31/0476* (2013.01); *C01B 31/0484* (2013.01)
USPC ........................................................ 423/448

(58) Field of Classification Search
USPC ........................................................ 423/448
See application file for complete search history.

(56) References Cited

U.S. PATENT DOCUMENTS

| | | | | |
|---|---|---|---|---|
| 3,404,061 | A * | 10/1968 | Bochman et al. | 428/143 |
| 3,502,759 | A * | 3/1970 | Olstowski et al. | 264/120 |
| 7,105,108 | B2 * | 9/2006 | Kaschak et al. | 252/378 R |
| 2005/0232845 | A1* | 10/2005 | Reynolds et al. | 423/448 |
| 2010/0021708 | A1* | 1/2010 | Kong et al. | 428/220 |

OTHER PUBLICATIONS

Jeong, et al., Evidence of Graphitic AB Stacking Order of Graphite Oxides, J. Am. Chem. Soc. 2008; 130: 1362-1366.*

* cited by examiner

*Primary Examiner* — Daniel C McCracken
(74) *Attorney, Agent, or Firm* — Kate Redmond

(57) ABSTRACT

Processes for preparing or handling graphene sheets wherein low bulk density graphene sheets are compressed. The graphene sheets may be produced by a thermal treatment such as exfoliation of precursor or reduction or annealing of previously existing graphene sheets and conveyed in a closed system to a compression apparatus.

18 Claims, 2 Drawing Sheets

COMPRESSION PROCESSES FOR GRAPHENE SHEETS

RELATED APPLICATIONS

This application claims priority to, and the benefit of U.S. Provisional Patent Application Ser. No. 61/171,871, filed on Apr. 23, 2009, entitled "Compression Processes for Graphene Sheets," which is incorporated herein by reference in its entirety.

FIELD OF THE INVENTION

Compression processes for preparing graphene sheets.

BACKGROUND

Graphene sheets have become not only an item of tremendous theoretical and experimental interest over past several years, but are being developed for commercial use. They tend to be materials having high surfaces area and very low bulk densities, and as such, can be awkward to handle. For example, their low bulk densities mean that even small amounts of graphene sheets can require substantial storage and packaging volumes. This can make the storage, packaging, and transportation of commercial scale amounts of graphene sheets unwieldy and costly. Since many graphene sheets are derived directly or indirectly from the exfoliation of graphite into individual sheets or layered structures having a thickness of a few sheets, attempts to increase the bulk density could cause graphite to be reformed from graphene sheets. The resulting materials could have significantly lower surface areas and/or be less easily dispersed into another material, such as a matrix, binder, etc. It would thus be desirable to obtain a method of increasing the bulk density of graphene sheets without significant restacking of the sheets and/or significantly affecting the surface area of the graphene sheets and/or their dispersability.

SUMMARY OF THE INVENTION

Disclosed herein is a process for preparing graphite sheets wherein a precursor is subjected to thermal treatment to produce graphite sheets. The graphene sheets are compressed in a compression apparatus with a pressure of about 5 to about 1000 psi. After they are prepared, the graphene sheets may be conveyed directly to the compression apparatus in a closed system and compressed.

DETAILED DESCRIPTION OF THE INVENTION

Figure 1:
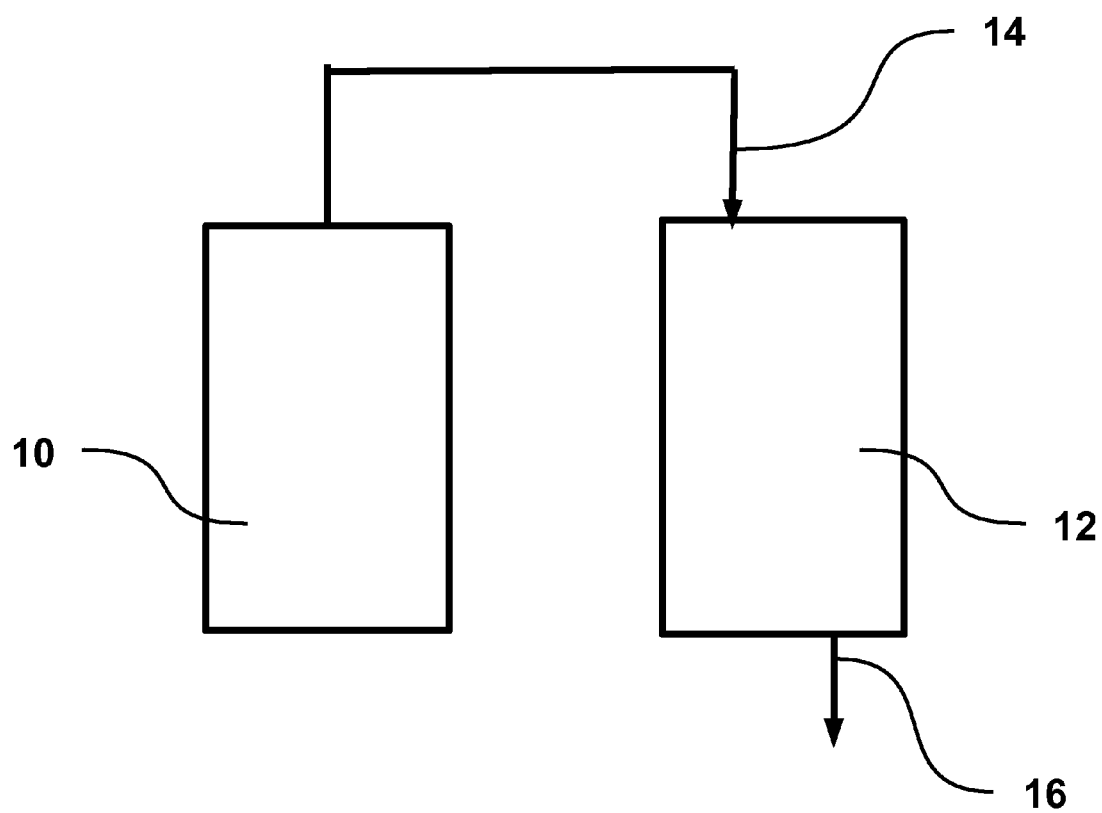
FIG. 1 is a schematic diagram of the process of the invention.

The graphene sheets may be made by the thermal exfoliation of a graphite-derived precursor or by the thermal treatment (such as reduction, annealing, etc.) of existing graphene sheets. As used herein, the term "thermal treatment" refers to processes such as exfoliation, reduction, annealing, etc. that generate graphene sheets. The thermal treatment may comprise two or more serial processes, such as exfoliation followed by reduction.

Graphene sheets are graphite sheets preferably having a surface area of from about 100 to about 2630 $m^2/g$. In some embodiments, the graphene sheets primarily, almost completely, or completely comprise fully exfoliated single sheets of graphite (these are approximately 1 nm thick and are often referred to as "graphene"), while in other embodiments, at least a portion of the graphene sheets may comprise at partially exfoliated graphite sheets, in which two or more sheets of graphite have not been exfoliated from each other. The graphene sheets may comprise mixtures of fully and partially exfoliated graphite sheets.

Graphene sheets may be formed by the thermal exfoliation of graphite oxide, expanded graphite, graphite intercalation compounds, etc. For example, graphite may be treated with oxidizing and/or intercalating agents and exfoliated. Graphite may also be treated with intercalating agents and electrochemically oxidized and exfoliated.

Graphite oxide (also known as graphene oxide or graphitic acid) may be produced by any method known in the art, such as by a process that involves oxidation of graphite using one or more chemical oxidizing agents and, optionally, intercalating agents such as sulfuric acid. Examples of oxidizing agents include nitric acid, sodium and potassium nitrates, perchlorates, peroxides (such as hydrogen peroxide), sodium and potassium permanganates, phosphorus pentoxide, bisulfites, etc. Preferred oxidants include $KClO_4$; $HNO_3$ and $KClO_3$; $KMnO_4$ and/or $NaMnO_4$; $KMnO_4$ and $NaNO_3$; $K_2S_2O_8$ and $P_2O_5$ and $KMnO_4$; $KMnO_4$ and $HNO_3$; $HNO_3$; and peroxides. Preferred intercalation agents include sulfuric acid. Graphite may also be treated with intercalating agents and electrochemically oxidized. Examples of methods of making graphite oxide include those described by Staudenmaier (*Ber. Stsch. Chem. Ges.* (1898), 31, 1481) and Hummers (*J. Am. Chem. Soc.* (1958), 80, 1339).

One example of a method for the preparation of graphene sheets is to oxidize graphite to graphite oxide, which is then thermally exfoliated to form graphene sheets (also known as thermally exfoliated graphite oxide), as described in US 2007/0092432, the disclosure of which is hereby incorporated herein by reference. The thusly formed graphene sheets may display little or no signature corresponding to graphite or graphite oxide in their X-ray diffraction pattern.

Examples of temperatures at which the thermal exfoliation of graphite oxide may be carried out are at least about 300° C., least about 400° C., least about 450° C., least about 500° C., least about 600° C., least about 700° C., least about 800° C., least about 850° C., least about 900° C., least about 950° C., and least about 1000° C. Preferred ranges include between about 750 about and 3000° C., between about 850 and 2500° C., between about 950 and about 2500° C., and between about 950 and about 1500° C.

The time of heating can range from less than a second to many minutes. For example, the time of heating can be less than about 0.5 seconds, less than about 1 second, less than about 5 seconds, less than about 10 seconds, less than about 20 seconds, less than about 30 seconds, or less than about 1 min. The time of heating can be at least about 1 minute, at least about 2 minutes, at least about 5 minutes, at least about 15 minutes, at least about 30 minutes, at least about 45 minutes, at least about 60 minutes, at least about 90 minutes, at least about 120 minutes, at least about 150 minutes, at least about 240 minutes, from about 0.01 seconds to about 240 minutes, from about 0.5 seconds to about 240 minutes, from about 1 second to about 240 minutes, from about 1 minute to about 240 minutes, from about 0.01 seconds to about 60 minutes, from about 0.5 seconds to about 60 minutes, from about 1 second to about 60 minutes, from about 1 minute to about 60 minutes, from about 0.01 seconds to about 10 minutes, from about 0.5 seconds to about 10 minutes, from about 1 second to about 10 minutes, from about 1 minute to about 10 minutes, from about 0.01 seconds to about 1 minute, from about 0.5 seconds to about 1 minute, from about 1 second to about 1 minute, no more than about 600 minutes, no more than about 450 minutes, no more than about 300 minutes, no more than about 180 minutes, no more than about 120 minutes, no more than about 90 minutes, no more than about 60 minutes, no more than about 30 minutes, no more than about 15 minutes, no more than about 10 minutes, no more than about 5 minutes, no more than about 1 minute, no more than about 30 seconds, no more than about 10 seconds, or no more than about 1 second. During the course of heating, the temperature may vary.

Examples of the rate of heating include at least about 120° C./min, at least about 200° C./min, at least about 300° C./min, at least about 400° C./min, at least about 600° C./min, at least about 800° C./min, at least about 1000° C./min, at least about 1200° C./min, at least about 1500° C./min, at least about 1800° C./min, and at least about 2000° C./min.

The graphene sheets (before or after compression) preferably have a surface area of at least about 100 m$^2$/g, or of at least about 200 m$^2$/g, or of at least about 300 m$^2$/g, or of least about 350 m$^2$/g, or of least about 400 m$^2$/g, or of least about 500 m$^2$/g, or of least about 600 m$^2$/g, or of least about 700 m$^2$/g, or of least about 800 m$^2$/g, or of least about 900 m$^2$/g, or of least about 700 m$^2$/g. The surface area may be about 400 to about 2630 m$^2$/g. The theoretical maximum surface area can be calculated to be 2630 m$^2$/g. The surface area includes all values and subvalues therebetween, especially including 200, 300, 400, 500, 600, 700, 800, 900, 1000, 1100, 1200, 1300, 1400, 1500, 1600, 1700, 1800, 1900, 2000, 2100, 2200, 2300, 2400, 2500, and 2630 m$^2$/g.

The graphene sheets preferably have number average aspect ratios of about 100 to 100,000, or of about 100 to about 50,000, or of about 100 to about 25,000, or of about 100 to about 10,000 (where "aspect ratio" is defined as the ratio of the longest dimension of the sheet to the shortest).

Surface area can be measured using either the nitrogen adsorption/BET method at 77 K or a methylene blue (MB) dye method in liquid solution. The BET method is preferred.

The dye method is carried out as follows: A known amount of graphene sheets is added to a flask. At least 1.5 g of MB are then added to the flask per gram of graphene sheets. Ethanol is added to the flask and the mixture is ultrasonicated for about fifteen minutes. The ethanol is then evaporated and a known quantity of water is added to the flask to re-dissolve the free MB. The undissolved material is allowed to settle, preferably by centrifuging the sample. The concentration of MB in solution is determined using a UV-vis spectrophotometer by measuring the absorption at $\lambda_{max}$=298 nm relative to that of standard concentrations.

The difference between the amount of MB that was initially added and the amount present in solution as determined by UV-vis spectrophotometry is assumed to be the amount of MB that has been adsorbed onto the surface of the graphene sheets. The surface area of the graphene sheets are then calculated using a value of 2.54 m$^2$ of surface covered per one mg of MB adsorbed.

The graphene sheets may be functionalized with, for example, oxygen-containing functional groups (including, for example, hydroxyl, carboxyl, and epoxy groups) and typically have an overall carbon to oxygen molar ratio (C/O ratio), as determined by elemental analysis of at least about 1:1, or more preferably, at least about 3:2. Examples of carbon to oxygen ratios include about 3:2 to about 85:15; about 3:2 to about 20:1; about 3:2 to about 30:1; about 3:2 to about 40:1; about 3:2 to about 60:1; about 3:2 to about 80:1; about 3:2 to about 100:1; about 3:2 to about 200:1; about 3:2 to about 500:1; about 3:2 to about 1000:1; about 3:2 to greater than 1000:1; about 10:1 to about 30:1; about 80:1 to about 100:1; about 20:1 to about 100:1; about 20:1 to about 500:1; about 20:1 to about 1000:1; about 50:1 to about 300:1; about 50:1 to about 500:1; and about 50:1 to about 1000:1. In some embodiments, the carbon to oxygen ratio is at least about 10:1, or at least about 20:1, or at least about 35:1, or at least about 50:1, or at least about 75:1, or at least about 100:1, or at least about 200:1, or at least about 300:1, or at least about 400:1, or at least 500:1, or at least about 750:1, or at least about 1000:1; or at least about 1500:1, or at least about 2000:1. The carbon to oxygen ratio also includes all values and subvalues between these ranges.

The graphene sheets may contain atomic scale kinks. These kinks may be caused by the presence of lattice defects in, or by chemical functionalization of the two-dimensional hexagonal lattice structure of the graphite basal plane.

Existing graphene sheets (which may be made using any suitable method, including the exfoliation methods described above, other chemical synthetic methods, mechanical exfoliation, etc.) may also be subjected to other thermal treatments, such as reduction and annealing processes. Such processes may, for example, produce graphene sheets having increased carbon to oxygen ratios, fewer lattice defects, etc. Reduction/annealing temperatures are preferably at least about 300° C., or at least about 350° C., or at least about 400° C., or at least about 500° C., or at least about 600° C., or at least about 750° C., or at least about 850° C., or at least about 950° C., or at least about 1000° C. The temperature used may be, for example, between about 750 about and 3000° C., or between about 850 and 2500° C., or between about 950 and about 2500° C. Reduction and annealing processes are preferably done under vacuum or under an inert atmosphere (such as argon or nitrogen) or reducing atmosphere (such as hydrogen (including hydrogen diluted with an inert gas such as argon or nitrogen)).

The time of heating can be for example, at least about 1 second, or at least about 10 second, or at least about 1 minute, or at least about 2 minutes, or at least about 5 minutes. In some embodiments, the heating time will be at least about 15 minutes, or about 30 minutes, or about 45 minutes, or about 60 minutes, or about 90 minutes, or about 120 minutes, or about 150 minutes. During the course of annealing/reduction, the temperature may vary within these ranges.

Compression steps may be performed between thermal treatment steps. For example, an exfoliation step may be performed, the product compressed, and the compressed product then subjected to a reduction/annealing step. Similarly, graphene sheets can be subjected to other treatments after a compression step and prior to a subsequent compression step.

The thermal treatments may be carried out in any combination of continuous, semi-continuous, batch, etc. processes. The may be done under a variety of atmospheres, including inert and reducing atmospheres (such as nitrogen, argon, and/or hydrogen atmospheres). Heating can be done in any appropriate vessel, such as a fused silica, mineral, ceramic, metal, etc. vessel. Heating may be done using any suitable means, including the use of furnaces, infrared heaters, microwave heaters, flash lamps, etc. As used herein, the term "thermal reactor" refers to an apparatus in which a thermal treatment is carried out. A thermal reactor can be an exfoliator, a reduction/annealing reactor, etc. It can be a combination of two or more devices, vessels, apparatus, etc., such as an exfoliator and reduction/annealing reactor in series.

Upon completion of the thermal treatment, the resulting graphene sheets are preferably compressed using a pressure of about 5 to about 1000 psi, or of about 5 to about 500 psi, or of about 5 to about 250 psi, or of about 5 to about 100 psi, or of about 10 to about 1000 psi, or of about 10 to about 500 psi, or of about 10 to about 250 psi, or of about 10 to about 250 psi. Two or more different pressures may be used during the compression. Any suitable compression means, such as a press (including a hydraulic press), may be used. Compression may be carried out in a series of steps involving two or more compression apparatus. The pressure(s) used need to be the same in each apparatus.

In some embodiments, the compressed graphene sheets may have a bulk density of at least about 0.05 g/cm$^3$, or at least about 0.1 g/cm$^3$, or at least about 0.2 g/cm$^3$. In some embodiments, the bulk densities are no more than about 2 g/cm$^3$, no more than about 1 g/cm$^3$, or no more than about 0.5 g/cm$^3$.

In some embodiments, the compressed graphene sheets may have a particle size distribution such that no more than about 10 volume percent of particles have a size of less than about 20 µm, as measured in an aqueous suspension using laser diffraction.

In some embodiments, the compressed graphene sheets may have a surface area as measured using the BET method with nitrogen at 77 K that is at least about 50 percent of the surface area of the corresponding uncompressed sheets.

The compressed graphene sheets may retain good dispersability in matrixes, such as polymers, liquid carriers, etc., relative to the corresponding uncompressed sheets.

The graphene sheets are preferably kept fully contained throughout the process. In one preferred embodiment, the graphene sheets are conveyed directly from the thermal reactor to the compression apparatus. An example is shown in FIG. 1, where upon exiting an thermal reactor 10, graphene sheets are conveyed along enclosed route 14 to compression apparatus 12 where the sheets are compressed. The compressed graphene sheets are then discharged at 16.

Figure 2:
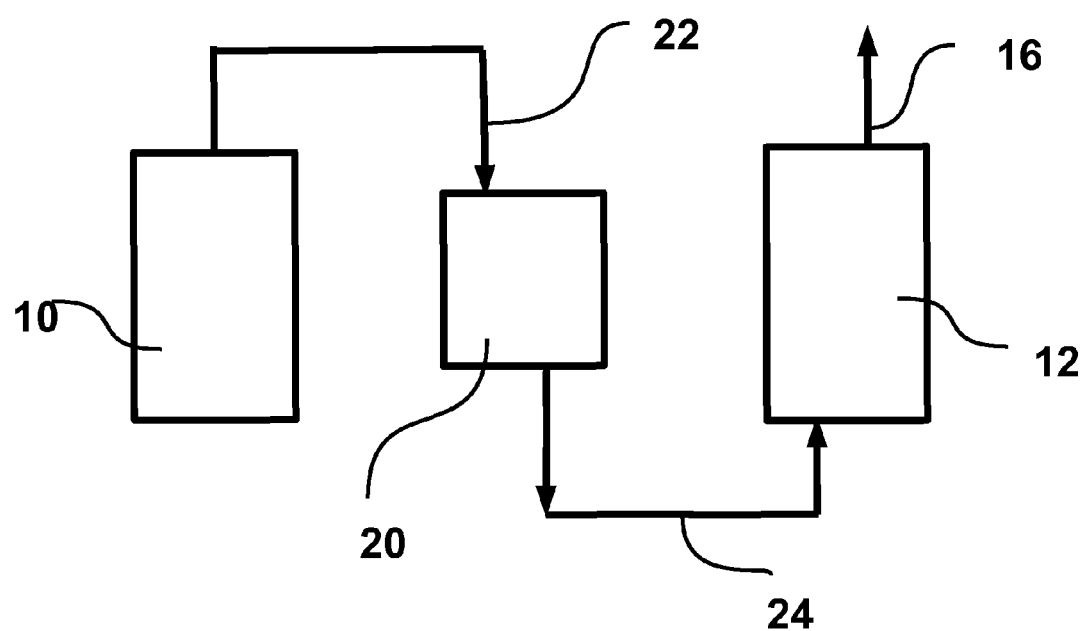
FIG. 2 is a schematic diagram of the process of the invention.

In another preferred embodiment, the graphene sheets are conveyed directly from the thermal reactor to an enclosed storage vessel. They may then, as convenient, be transferred at a later point to the compression apparatus. An example is shown in FIG. 2, where upon exiting thermal reactor 10, graphene sheets are conveyed along enclosed route 22 to storage vessel 20, where the sheets are held until needed, at which time the graphene sheets are conveyed along enclosed route 24 to compression apparatus 12. The compressed graphene sheets are then discharged at 16. The storage vessel may be disconnected from the thermal reactor and/or the compression apparatus and moved or stored. It is preferably maintained in an enclosed state throughout.

The compression step may be operated as a batch, semi-continuous, continuous, etc. process. For example, in a continuous heat treatment process, as the graphene sheets exit the thermal reactor, they are conveyed directly into the compression apparatus. Similarly, in a batch heat treatment process, the graphene sheets may be transferred directly to the compression apparatus. After exiting the thermal reactor, the graphene sheets may also be stored in a storage vessel after for immediate or later use. For example, they may be allowed to accumulate in the storage vessel for a period of time after which all or a portion of the stored graphene sheets are transferred to the compression apparatus.

Large amounts graphene sheets may be allowed to accumulate in the compression apparatus before they are compressed, or smaller amounts may be compressed at a given time. For example, the compression apparatus may be operated at intervals. For example, if a continuous heat treatment process is used, the graphene sheets may be allowed to accumulate in the compression apparatus before they are compressed. In another instance, if, for example, the compressor operates with a hydraulic piston that is continuously retracted and expanded, the graphene sheets that accumulate in the compression apparatus between each stroke of the piston will be compressed. The compressed sheets may then be discharged.

EXAMPLES

Example 1

Graphite oxide is thermally exfoliated to form graphene sheets. The sheets are compressed using a hydraulic press into disks having a diameter of 61.8 mm. In a first experiment, about 1 MPa (145 psi) of pressure is applied to a 3 g sample of uncompressed graphene sheets, compressing it to a thickness of about 4 mm. The resulting sample has a density of about 0.25 g/cm$^3$. In a second experiment, about 1.67 MPa (242 psi) of pressure is applied to a 3 g sample of uncompressed graphene sheets, compressing it to a thickness of about 2.9 mm. The resulting sample has a density of about 0.35 g/cm$^3$.

Example 2

The compressed graphene sheets of Example 1 are melt blended (in separate experiments) with poly(methyl methacrylate) and linear low density polyethylene at a five weight percent loading relative to the total amount of graphene sheets and polymer. The melt blended compositions are molded into plaques whose bulk resistivities are measured using a multimeter. The resisitivities are no more than about 25% less (and often no more than about 10 to 20% less) than the corresponding resistivities of similar materials made by melt blending uncompressed graphene sheets with the corresponding polymers.

Example 3

The surface areas of graphene sheets before and after compression are measured using the BET technique in a Quantachrome Nova 2200e surface area analyzer. Powder samples are degassed under vacuum at 300° C. for at least 4 hours. Surface areas are determined by five point nitrogen adsorption measurements at 77 K. Two surface area measurements are made for a sample of uncompressed graphene sheets. The average surface area is about 860 m$^2$/g. Two surface area measurements are also made for a sample of the same graphene sheets after they have been compressed at about 7,000 P (10 psi). The average surface area is about 550 m$^2$/g.

Example 4

The particle size distributions of graphene sheets compressed at about 100 psi are measured using a Malvern Mastersizer 2000 laser diffractor. Measurements are made in an aqueous suspension (in which agglomerates are broken up with ultrasonic energy prior to the measurements) and on dry powder. The dry samples are sieved to remove particles having a size of greater than 2000 µm. The particle size distribution of the remaining fraction is obtained using the laser diffractor (referred to as the "diffractor only" results). A dry sample particle size distribution is also obtained by normalizing and blending the sieve particle size data with the diffractor only data. This is referred to as the "sieve blend" data.

The results are given in Table 1. Each percentage heading refers to the volume percentage of particles having the particle size indicated in the table or less. The particles sizes are given in μm.

TABLE 1

|  | 10% | 50% | 90% |
| --- | --- | --- | --- |
| Liquid suspension (particle size, μm) | 28 | 79 | 194 |
| Dry dispersion -- diffractor only (particle size, μm) | 27 | 110 | 469 |
| Dry dispersion -- sieve blend (particle size, μm) | 42 | 1735 | 4630 |

The invention claimed is:

1. A process for preparing graphene sheets having a surface area of at least about 100 m²/g and a carbon to oxygen molar ratio of between about 3:2 to about 1000:1, comprising the steps of thermally exfoliating graphite oxide to produce graphene sheets by heating the graphite oxide to a temperature of at least about 600° C. at a rate of at least about 120° C./min, conveying the graphene sheets in a closed system to a compression apparatus, and compressing the graphene sheets with a pressure of about 5 to about 1000 psi.

2. The process of claim 1, wherein the pressure is about 5 to about 250 psi.

3. The process of claim 1, wherein the pressure is about 10 to about 250 psi.

4. The process of claim 1, wherein the graphene sheets are stored before being conveyed to the compression apparatus.

5. The process of claim 1, wherein the compressed graphene sheets have a bulk density of at least about 0.05 g/cm³.

6. The process of claim 1, wherein the compressed graphene sheets have a bulk density of at least about 0.1 g/cm³.

7. The process of claim 1, wherein the compressed graphene sheets have a particle size distribution such that no more than about 10 volume percent of particles have a size of less than about 20 μm.

8. The process of claim 1, wherein the graphene sheets have a surface area of at least about 200 m²/g.

9. The process of claim 1, wherein the graphene sheets have a surface area of at least about 300 m²/g.

10. The process of claim 1, wherein the graphene sheets have a surface area of at least about 400 m²/g.

11. The process of claim 1, wherein the graphene sheets have a surface area of at least about 600 m²/g.

12. The process of claim 1, wherein the graphene sheets have a carbon to oxygen molar ratio of between about 3:2 to about 500:1.

13. The process of claim 1, wherein the graphene sheets have a carbon to oxygen molar ratio of between about 3:2 to about 200:1.

14. The process of claim 1, wherein the graphene sheets produced by subjecting graphite oxide to thermal treatment are reduced and/or annealed prior to being compressed to produce graphene sheets.

15. The process of claim 1, further comprising the step of reducing and/or annealing the graphene sheets after they have been compressed.

16. The process of claim 1, wherein the graphene sheets have a carbon to oxygen molar ratio of at least about 10:1.

17. The process of claim 1, wherein the graphene sheets have a carbon to oxygen molar ratio of at least about 20:1.

18. The process of claim 1, wherein the graphene sheets have a carbon to oxygen molar ratio of at least about 50:1.

* * * * *